(12) United States Patent
Katz et al.

(10) Patent No.: US 11,150,599 B2
(45) Date of Patent: Oct. 19, 2021

(54) AIR BEARINGS

(71) Applicant: Hewlett-Packard Development Company, L.P., Spring, TX (US)

(72) Inventors: Israel Katz, Ness Ziona (IL); Boris Khodos, Ness Ziona (IL); Avi Barazani, Ness Ziona (IL); Sergio Turnowski, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/965,031

(22) PCT Filed: Mar. 16, 2018

(86) PCT No.: PCT/US2018/022934
§ 371 (c)(1),
(2) Date: Jul. 27, 2020

(87) PCT Pub. No.: WO2019/177624
PCT Pub. Date: Sep. 19, 2019

(65) Prior Publication Data
US 2020/0401074 A1    Dec. 24, 2020

(51) Int. Cl.
*G03G 21/16* (2006.01)
*F16C 32/06* (2006.01)

(52) U.S. Cl.
CPC ..... *G03G 21/1647* (2013.01); *F16C 32/0614* (2013.01); *G03G 2221/1654* (2013.01)

(58) Field of Classification Search
CPC ....... G03G 21/1647; G03G 2221/1654; G03G 21/1671; G03G 15/02; G03G 21/206; G03G 21/1661; G03G 21/007; F16C 32/0614
See application file for complete search history.

(56) References Cited

U.S. PATENT DOCUMENTS

| 4,074,283 | A | | 2/1978 | Fink et al. |
| 4,515,461 | A | | 5/1985 | Vackier |
| 5,367,363 | A | * | 11/1994 | Kai ...................... G03G 21/007 399/113 |
| 5,940,665 | A | * | 8/1999 | Domoto ................. G03G 15/11 399/241 |
| 6,229,979 | B1 | | 5/2001 | Ishii et al. |
| 7,505,715 | B2 | | 3/2009 | Kamoshida et al. |

(Continued)

FOREIGN PATENT DOCUMENTS

| EP | 0071469 A1 | 2/1983 |
| EP | 0883036 B1 | 4/2004 |

(Continued)

*Primary Examiner* — Sandra Brase
(74) *Attorney, Agent, or Firm* — HP Inc. Patent Department

(57) ABSTRACT

A support assembly is disclosed. The support assembly may comprise a component to interact with a photoconductive imaging unit, the component being rotatable relative to the photoconductive imaging unit. The support assembly may comprise an air bearing positioned adjacent to a surface of the photoconductive imaging unit, the air bearing to generate a cushion of gas to support the component at a defined distance from the photoconductive imaging unit. A method and a print apparatus are also disclosed.

12 Claims, 7 Drawing Sheets

(56) References Cited

U.S. PATENT DOCUMENTS

| | | | |
|---|---|---|---|
| 7,764,296 B2 * | 7/2010 | Leoni | G03G 15/05 |
| | | | 347/112 |
| 8,328,600 B2 | 12/2012 | Duescher | |
| 8,438,976 B2 | 5/2013 | Levanon et al. | |
| 8,953,968 B2 | 2/2015 | Wayman | |
| 2007/0280737 A1 | 12/2007 | Berg et al. | |
| 2016/0216631 A1 | 7/2016 | Gila et al. | |
| 2017/0329252 A1 | 11/2017 | Emanueli et al. | |
| 2018/0017886 A1 | 1/2018 | Borenstain et al. | |

FOREIGN PATENT DOCUMENTS

| | | |
|---|---|---|
| JP | 2007-025127 A | 2/2007 |
| RU | 2583379 C1 | 5/2016 |
| WO | 2010/106079 A1 | 9/2010 |
| WO | WO-2017071769 A1 | 5/2017 |

* cited by examiner

AIR BEARINGS

BACKGROUND

Within some printing systems, components, such as rollers, may be mounted close to one another so that they can interact with one another.

One example of a printing technology that may be implemented in the field of printing is liquid electrophotography (LEP). LEP printing may involve interactions between a series of rollers, to enable the transfer of electrically-charged liquid ink via the rollers to a substrate. The transfer of ink may involve interactions between multiple rollers and/or between a roller and another component.

BRIEF DESCRIPTION OF DRAWINGS

Examples will now be described, by way of non-limiting example, with reference to the accompanying drawings, in which.

DETAILED DESCRIPTION

Figure 1:
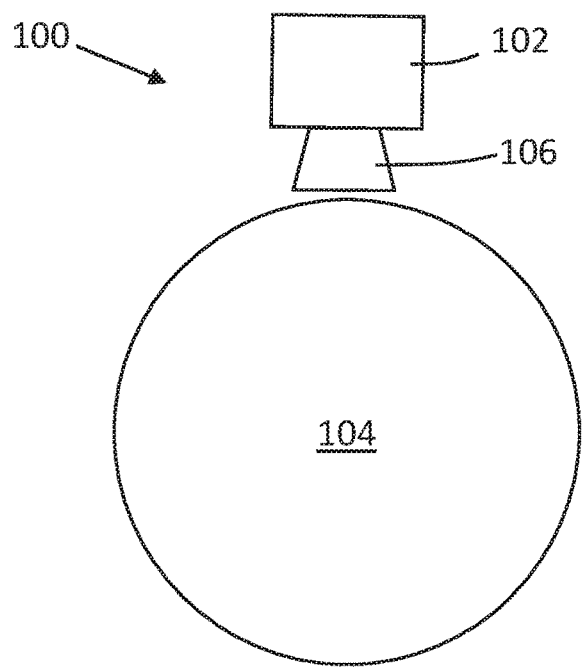
FIG. 1 is a simplified schematic of an example of a support assembly.

The disclosure herein relates to an air bearing and its use with a component of a printing apparatus. Aspects of the disclosure may be implemented in printing systems using various different printing technologies. Some examples are described in the context of one particular technology, liquid electrophotography.

In a liquid electrophotography (LEP) printing system, print agent, such as ink, is stored in a reservoir and may be transferred using a binary ink developer (BID). Each BID transfers print agent of a particular colour, so an LEP printing system may include, for example, seven BI Ds. Print agent from a BID is selectively transferred from a developer roller of the BID in a layer of substantially uniform thickness to an imaging plate of a photoconductive imaging plate, such as a photo imaging plate (PIP). The selective transfer of print agent may be achieved through the use of electrically-charged (or electrostically-charged) print agent. The entire imaging plate, which may be located on a rotatable roller or drum, may be electrostatically charged, using a charge roller (e.g. a ceramic charge roller), which rotates relative to the imaging plate. Areas on the imaging plate representing an image to be printed may then be discharged, for example by forming a latent image on the imaging plate using a laser beam or other type of light. Print agent is transferred to those portions of the imaging plate that have been discharged. The imaging plate may transfer the print agent to another roller, such as an intermediate transfer member (ITM), which may be covered by a replaceable print blanket. The print agent may subsequently be transferred onto a printable substrate, such as paper.

In other printing systems, the imaging plate may comprise a surface other than a PIP. For example the imaging plate may comprise a sleeve formed or placed around a roller or drum. Such a sleeve may be formed from a material which can be selectively charged and discharged. In some examples, the sleeve may be formed from a particularly delicate or fragile material which may be damaged easily if knocked, for example.

The term "imaging plate" may be referred to as an imaging surface. The imaging surface may, in some examples, comprise the surface of a photoconductive imaging unit or component.

In order for the imaging plate to be charged, the charge roller is brought into close proximity with the imaging plate. Other components of the printing system may also be brought into close proximity with the imaging plate in order to interact with it during the printing process. For example, a writing head, or print head, may be brought into close proximity with the imaging plate to generate the latent image from the imaging plate, for example by discharging particular portions of the electrostatically-charged imaging plate. The writing head may, for example, include a laser source. In order for the writing head to generate the latent image accurately, the writing head is to be positioned at a particular distance from the imaging plate during use. The printing system may include a cleaning mechanism (also referred to as a cleaning station) to provide a cleaning effect to at least a portion of the imaging plate. For example, the cleaning mechanism may include a roller-mounted sponge to remove print agent from the imaging plate as the sponge and the imaging surface rotate relative to one another. The cleaning mechanism is to be positioned at a particular distance from the imaging plate so that components of the cleaning mechanism can interact adequately with the imaging plate.

According to the present disclosure, an air bearing mechanism is used to maintain a defined separation between components of the printing system, such as the cleaning mechanism and/or the charge roller, and a surface of a photoconductive imaging unit (e.g. an imaging plate). In some examples, the air bearing mechanism may be used to generate a cushion of gas to support a component of the printing system relative to the imaging plate. Thus, the air bearing mechanism may be considered to form part of a support assembly, or air bearing assembly, for supporting a component relative to the imaging plate.

Referring to the drawings, FIG. 1 is a simplified, schematic illustration of a support assembly 100. The support assembly 100 comprises a component 102 to interact with a photoconductive imaging unit 104, the component being rotatable relative to the photoconductive imaging unit. The component 102 may be referred to as a print component. The assembly 100 also comprises an air bearing 106 positioned adjacent to a surface of the photoconductive imaging unit 104, the air bearing to generate a cushion of gas to support the component 102 at a defined distance from the photoconductive imaging unit. In some examples, the air bearing 106 may be positioned between the component 102 and the surface of the photoconductive imaging unit 104. The photoconductive imaging unit 104 may, in some examples, be considered to comprise a drum or roller, and its surface may be considered to comprise an imaging plate. In some examples, the photoconductive imaging unit 104 may include a separate imaging surface in the form of a sleeve or plate formed around the photoconductive imaging unit. In other examples, the photoconductive imaging unit 104 may comprise an imaging surface formed as a belt on multiple rotatable structures.

An air bearing, also referred to as an aerostatic bearing, is a bearing that uses a thin film or cushion of pressurised gas (e.g. air) to create a load-bearing interface between a surface of the air bearing and another surface. The cushion of gas between the surfaces prevents the surfaces from contacting one another and, therefore, very low amounts of friction exist at the interface. Generally, in an air bearing, pressurised air is forced through apertures formed in an air bearing pad. In some examples, the air bearing pad may comprise a porous or partially-porous material. In other examples, the air bearing pad may include discrete apertures or orifices, and in other examples, the air bearing pad may include slots through which the pressurised gas passes. Thus, the air bearing 106 may be considered to comprise an air bearing pad.

Pressurised gas forced through the air bearing 106 has the effect of reducing friction between the air bearing pad and the photoconductive imaging unit 104. The pressurised gas may be supplied by a compressor. In some examples, the air bearing 106 may be urged towards the photoconductive imaging unit 104, for example by the weight of the component to which it is attached. In other examples, the air bearing 106 and/or the component 102 may be forced towards the photoconductive imaging unit 104 using a separate biasing mechanism or biasing member. Urging the air bearing 106 towards the photoconductive imaging unit 104 helps to minimize the gap between them, and compressing the gas cushion helps to increase the stiffness ratio of the air bearing, allowing it to support loads with minimal oscillatory motion. The pressure of gas supplied through the air bearing 106 is chosen to create a relatively high spring stiffness of the gas cushion, such that any compression of the gas cushion is damped as much as possible.

An air bearing, such as the air bearing 106, may be used to maintain a defined distance or separation between various components of a print apparatus and the photoconductive imaging unit 104.

In some examples, the component 102 may comprise a charge generation component to generate an electrostatic charge on the surface of the photoconductive imaging unit 104 as the charge generation component is rotated relative to the photoconductive imaging unit. For example, the charge generation component may comprise a charge roller. In some examples, the charge generation component and the photoconductive imaging unit 104 may both rotate relative to one another. For example, the charge generation component may rotate in an opposite direction to the direction of rotation of the photoconductive imaging unit 104.

The component 102 may, in some examples, comprise a cleaning component for removing print agent from at least a portion of the surface of the photoconductive imaging unit 104. An example of the cleaning component is discussed in greater detail below. However, in some examples, such a cleaning component may include a sponge roller, or multiple sponge rollers, to engage and remove excess print agent from the surface of the photoconductive imaging unit 104. For example, a sponge on the sponge roller may absorb print agent from the surface of the photoconductive imaging unit, and the sponge roller may be compressed so as to release the removed print agent into a container elsewhere in the print apparatus. The sponge roller may, for example, rotate relative to the photoconductive imaging unit 104. In some examples, the photoconductive imaging unit 104 may rotate in a first direction, and the sponge roller may rotate in a second, opposite direction.

Figure 2:
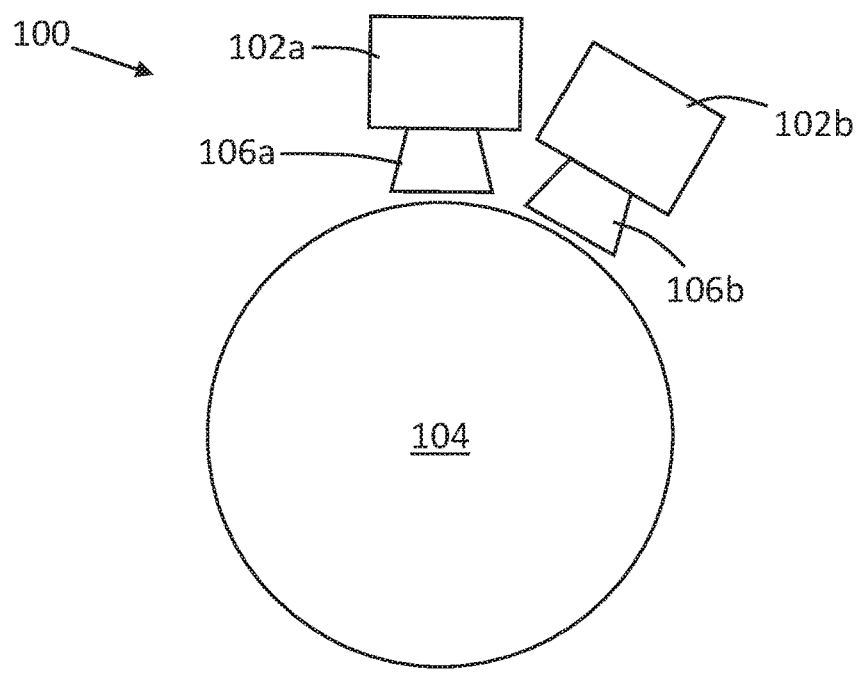
FIG. 2 is a simplified schematic of an example of multiple support assemblies.

In some examples, multiple support assemblies 100 and, therefore, multiple air bearings, may be included in a printing system. FIG. 2 is a simplified, schematic illustration of multiple support assemblies. In this example, a first component 102a has an associated first air bearing 106a, and a second component 102b has an associated second air bearing 106b. In some examples, the first air bearing 106a may be positioned between the first component 102a and the photoconductive imaging unit 104, and the second air bearing 106b may be positioned between the second component 102b and the photoconductive imaging unit 104. In other examples, the air bearing 106a, 106b may be positioned elsewhere relative to the components 102a, 102b, while still serving to maintain a constant defined distance between the components and the photoconductive imaging unit 104. In the example shown in FIG. 2, the first component 102a may, for example, comprise a charge generation component, such as a charge roller, and the second component 102b may, for example, comprise a cleaning station or a roller, such as a sponge roller, to effect cleaning of the surface of the photoconductive imaging unit 104.

Figure 3:
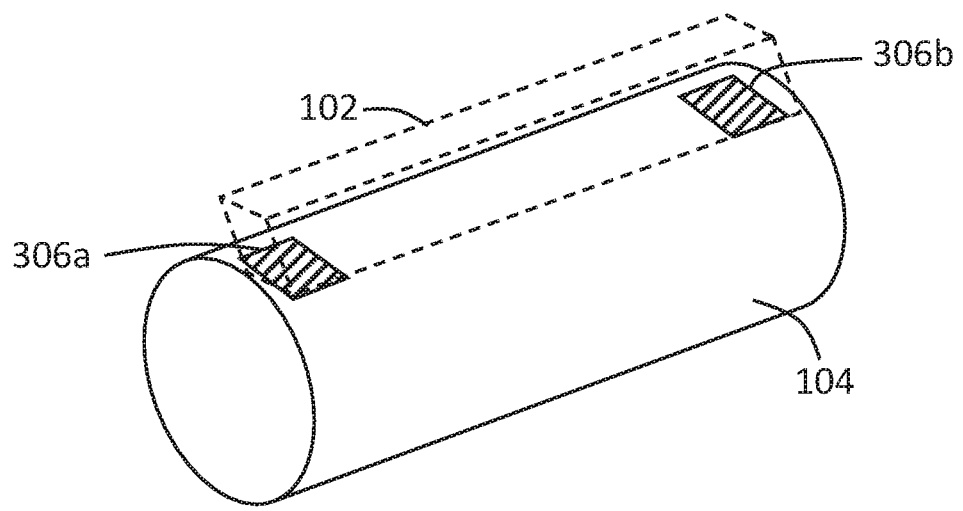
FIG. 3 is a simplified schematic of a further example of a support assembly.

According to some examples, a single air bearing 106 may be provided for each component 102. For example, the air bearing 106 may be positioned centrally with respect to the component and/or may extend partially or fully along the length of the component 102. In other examples, multiple air bearings 106 may be provided for each component 102. FIG. 3 is a simplified schematic of a further example of the support assembly 100. FIG. 3 shows the photoconductive imaging unit 104 in a schematic perspective view. In this example, the air bearing 106 includes a pair of air bearings 306a, 306b to maintain the component 102 (shown with a dashed line for clarity) at a defined distance from the surface of the photoconductive imaging unit 104. The air bearings 306a, 306b may, for example, be located at, or near to, ends of the component 102. In this way, the component 102 may interact with the surface of the photoconductive imaging unit 104 in a central region (i.e. between the air bearings 306a, 306b).

Figure 4:
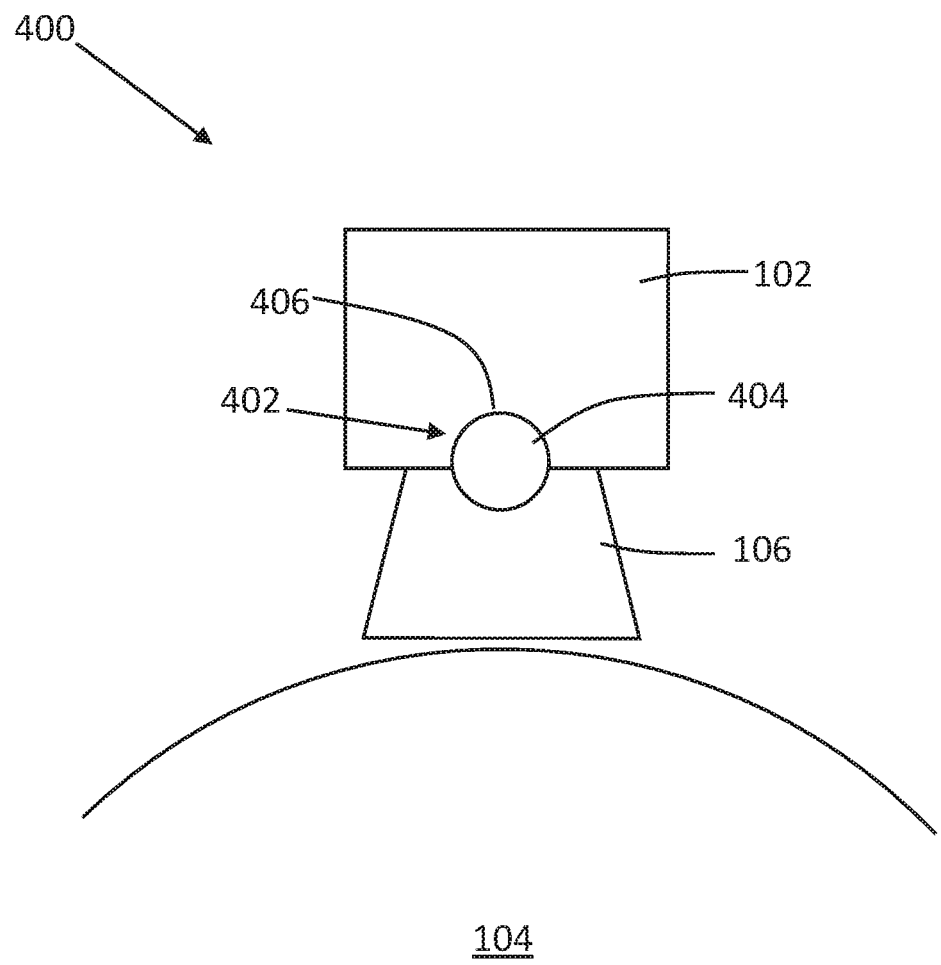
FIG. 4 is a simplified schematic of a further example of a support assembly.

The component (or components) 102 may be mounted relative to the photoconductive imaging unit 104 using various mounting techniques. In some examples, the component 102 may be mounted to the air bearing 106 using a ball joint. A ball joint, also referred to as a spherical joint or a ball-and-socket joint, is a type of connection which allows for free rotation about the joint. FIG. 4 is a simplified schematic of a further example of a support assembly 400. In the support assembly 400, the component 102 is connected to the air bearing 106 by a ball/spherical joint 402. The ball joint 402 may include a ball member or spherical member 404 provided at an end (or both ends) of the component 102. The ball member 404 is received, or partially received, in a recess 406 formed in the air bearing 106, such that the air bearing is rotatable relative to the ball member. With this arrangement, when pressurised gas is delivered through the air bearing 106 towards the photoconductive imaging unit 104, the air bearing may rotate about the ball member 404 into a stable position relative to the photoconductive imaging unit. In this way, the air bearing 106 is able to align appropriately to the surface of the photoconductive imaging unit 104. In some examples, a ball joint 402 may be provided at both ends of the component 102 while, in other examples, the print component may be connected to the air bearing 106 using a different fixing at one or both ends.

In some examples, the air bearings 106 may be positioned such that the component 102 to which they are connected is positioned above the air bearing. In this way, the weight of the component 102 may apply a biasing (e.g. downward) force on the air bearing 106 towards the photoconductive imaging unit 104. The force acting on the air bearing 106 towards the photoconductive imaging unit 104 acts against the force resulting from the pressurised gas being directed onto the surface of the photoconductive imaging unit. This helps to maintain the defined separation between the component 102 and the surface of the photoconductive imaging unit 104. As noted above, the photoconductive imaging unit 104 may, in some examples, comprise a roller or drum capable of rotating about its axis. In such examples, run-out (e.g. radial run-out) may result if the axis of rotation of the photoconductive imaging unit 104 is not perfectly central with regard to its outer surface. By urging the component 102 (and therefore the air bearing 106) towards the photoconductive imaging unit 104 as the imaging plate is rotated, any run-out is compensated for as the air bearing (and therefore the component) will be caused to track the surface of the photoconductive imaging unit. In other words, the component 102 will be kept at the defined distance from the photoconductive imaging unit 104, even if run-out causes the location of the surface of the photoconductive imaging unit relative to its axis to vary as it rotates.

In some examples, the support assembly 100, 400 may further comprise a biasing member to urge the component 102 towards the photoconductive imaging unit 104. The biasing member may serve to apply a force to the component 102 in the direction of the photoconductive imaging unit 104, which may be in addition to any force generated by the weight of the component.

Thus, during use, the component 102, or a portion of the component, may rotate relative to the photoconductive imaging unit 104. In some examples, as noted above, the component 102 and the photoconductive imaging unit 104 may both rotate, for example in opposite directions. The support assembly 100, 400 causes the formation of a gas cushion between the air bearing 106 (e.g. an air bearing pad of the air bearing) and the surface of the photoconductive imaging unit 104, and the thickness of the gas cushion may be maintained constant, or approximately constant, due to the weight of the component 102 and/or due to a biasing force generated by a biasing member.

Accordingly, the distance between the component 102 and the surface of the photoconductive imaging unit 104 is also kept constant, or approximately constant. In some examples, the air bearing 106 is to generate a cushion of gas such that the separation between the component 102 and the surface of the photoconductive imaging unit 104 is between around 5 micrometres (μm) and around 80 μm. In other examples, the defined distance may be between around 5 μm and around 50 μm. In other examples, the defined distance may be between around 5 μm and around 20 μm. In other examples, the defined distance may be between around 5 μm and around 10 μm. In other examples, the defined difference may be larger or smaller, and the defined distance may depend on the nature and purpose of the component 102.

By using a support assembly 100, 400 as the mounting mechanism to mount the component 102 relative to the photoconductive imaging unit 104, contact between the mounting mechanism and the surface of the photoconductive imaging unit can be prevented. Thus, there is far less risk that any contact between the mounting mechanism and the surface of the photoconductive imaging unit 104 will cause damage to the surface. Therefore, the air bearing 106 may be positioned such that it generates the cushion of gas between the air bearing and the surface of the photoconductive imaging unit 104. Specifically, the gas cushion may be formed between the air bearing pad of the air bearing 106 and a portion of the surface of the photoconductive imaging unit 104 which might receive the latent image to be printed. In other words, the mounting mechanism (i.e. the support assembly) can act directly on an active portion of the surface of the photoconductive imaging unit 104, rather than on an inactive portion, such as at the ends of the imaging unit.

In other examples, however, the air bearing may be positioned such that a cushion of gas is generated between the air bearing and an inactive portion of the photoconductive imaging unit, such as an end region. An end region of the photoconductive imaging unit may be referred to as a bearing region, or a drum bearer. The end regions of the photoconductive imaging unit may be formed from a material of a relatively high hardness, to reduce the risk of the photoconductive imaging unit being damaged in these regions, where it is intended to mount the unit. Thus, rather than directing air onto the imaging surface of the photoconductive imaging unit, as discussed in some examples herein, in other examples, air from the air bearing may be directed on to the end regions (e.g. the drum bearers) of the photoconductive imaging unit. Such an arrangement might be used when the air bearing is not to be positioned directly over the imaging surface (e.g. the active portion) of the photoconductive imaging unit.

Since there is no contact between the air bearing 106 and the surface of the photoconductive imaging unit 104 (whether the air bearing is positioned over the active portion or the inactive portion of the photoconductive imaging unit), no vibrations are induced between the components (or negligible vibrations are induced which may be disregarded). Large vibrations could result in print defects. Therefore, mounting the component 102 relative to photoconductive imaging unit 104 using a support assembly 100, 400 incorporating air bearing 106 may reduce the chance of print defects being introduced.

Figure 5:
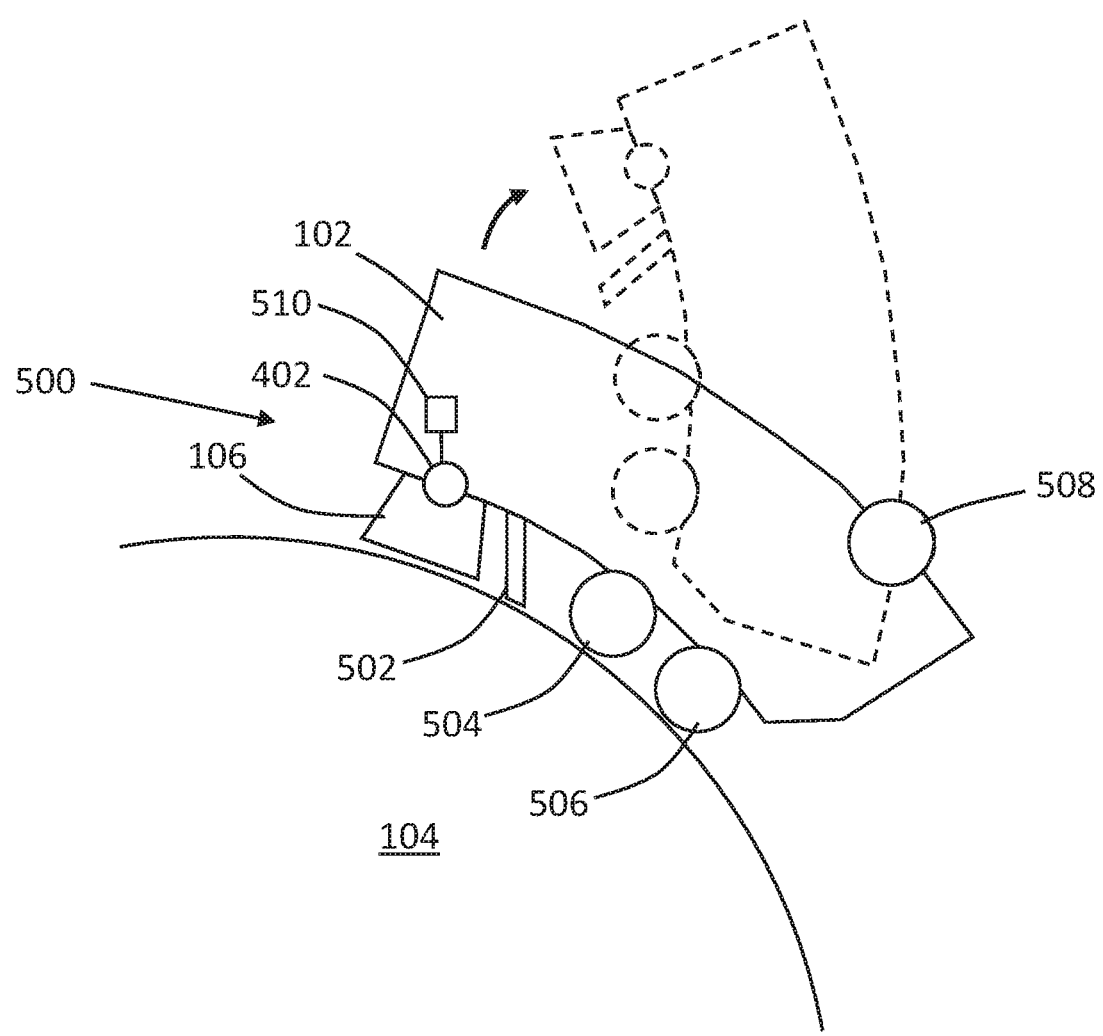
FIG. 5 is a simplified schematic of a further example of a support assembly.

FIG. 5 is a simplified schematic of an example of a support assembly 500 for a component 102. In this example, the component 102 comprises a cleaning component, such as a cleaning station. In the example shown, the cleaning component 102 is attached to the air bearing 106 using a ball joint 402. In use, the air bearing 106 generates a cushion of gas between an air bearing pad of the air bearing and the surface of the photoconductive imaging unit 104. The cleaning component 102 includes subcomponents to interact with the surface of the photoconductive imaging unit 104 during use. In the example shown, the cleaning component 102 includes a wiper 502 to wipe or scrape a substance, such as print agent, from the surface of the photoconductive imaging unit as the imaging unit rotates relative to the wiper. The cleaning component also includes a sponge roller 504 to rotate relative to the photoconductive imaging unit 104. As the sponge roller 504 rotates, it engages the surface of the photoconductive imaging unit 104 and may capture (e.g. absorb) a substance, such as print agent, from the surface of the photoconductive imaging unit as the imaging unit rotates relative to the sponge roller. In the example shown in FIG. 5, the cleaning component 102 further includes an application roller 506 to apply a substance to this surface of the photoconductive imaging unit 104 as the application roller rotates relative to the photoconductive imaging unit. For example, the application roller 506 may apply a layer of imaging oil to the surface of the photoconductive imaging unit. Imaging oil may help to maintain the quality of the photoconductive imaging unit 104, and may help to lengthen the life of the surface of the imaging unit. It may be intended that each of the subcomponents 502, 504, 506 of the cleaning component 102 is to be positioned at a defined distance from the surface of the photoconductive imaging unit 104 in order to perform its function. The use of the support assembly 500 incorporating an air bearing 106 helps to maintain the cleaning component 102 at an intended defined distance from the photoconductive imaging unit 104.

When the cleaning component 102 is positioned such that its subcomponents 502, 504, 506 are able to interact with the surface of the photoconductive imaging unit 104, the cleaning component may be said to be in an active position. In some examples, such as the example shown in FIG. 5, the cleaning component 102 may comprise a pivot member 508 to enable the cleaning component to pivot between the active position and an inactive position, as shown by the dashed lines in FIG. 5. In the inactive position, the subcomponents 502, 504, 506 of the cleaning component 102 are not able to interact with the surface of the photoconductive imaging unit 104. For example, the cleaning component 102 may be moved into the inactive position when it is not intended to remove substance from the surface of the photoconductive imaging unit 104. While, in the example shown in FIG. 5, the pivot member 508 is used to enable movement of the cleaning component 102 between the active and inactive positions, in other examples, other movement mechanisms may be implemented. It will also be appreciated that, while in FIG. 5 the component 102 is a cleaning component, any components that are to interact with the photoconductive imaging unit 104 may be provided with suitable movement mechanisms to enable them to move between an active and inactive position. In general, the cleaning component 102 may be movable relative to the photoconductive imaging unit 104 between a first position in which the cleaning component is to interact with the surface of the photoconductive imaging unit and a second position in which the component is not to interact with the surface of the photoconductive imaging unit.

In examples in which the air bearing 106 is mounted to the component 102 using a ball joint 402, the support assembly 100, 400, 500 may further comprise a locking mechanism 510 to lock the ball joint so as to restrict motion of the component 102 within the ball joint. For example, the ball joint 402 may be temporarily locked, then released when it is intended that movement of the component 102 within the ball joint is to be enabled. By using the locking mechanism 510, once the component 102 is in its intended, active position relative to the photoconductive imaging unit 104, the ball joint may be locked, so that further movement of the component relative to the surface of the photoconductive imaging unit is restricted or prevented. It will be appreciated that the locking mechanism 510 may be incorporated into any of the support assemblies disclosed herein. In examples in which the component 102 is not movable between an active position and an inactive position, a locking mechanism 510 may be provided to restrict motion of the component within the ball joint 402, for example once the air bearing 106 is appropriately aligned with, and/or oriented with respect to, the surface of the photoconductive imaging unit 104. An appropriate alignment may, for example, occur when the air bearing pad of the air bearing 106 (or a portion thereof) is substantially parallel to the surface of the photoconductive imaging unit 104.

Figure 6:
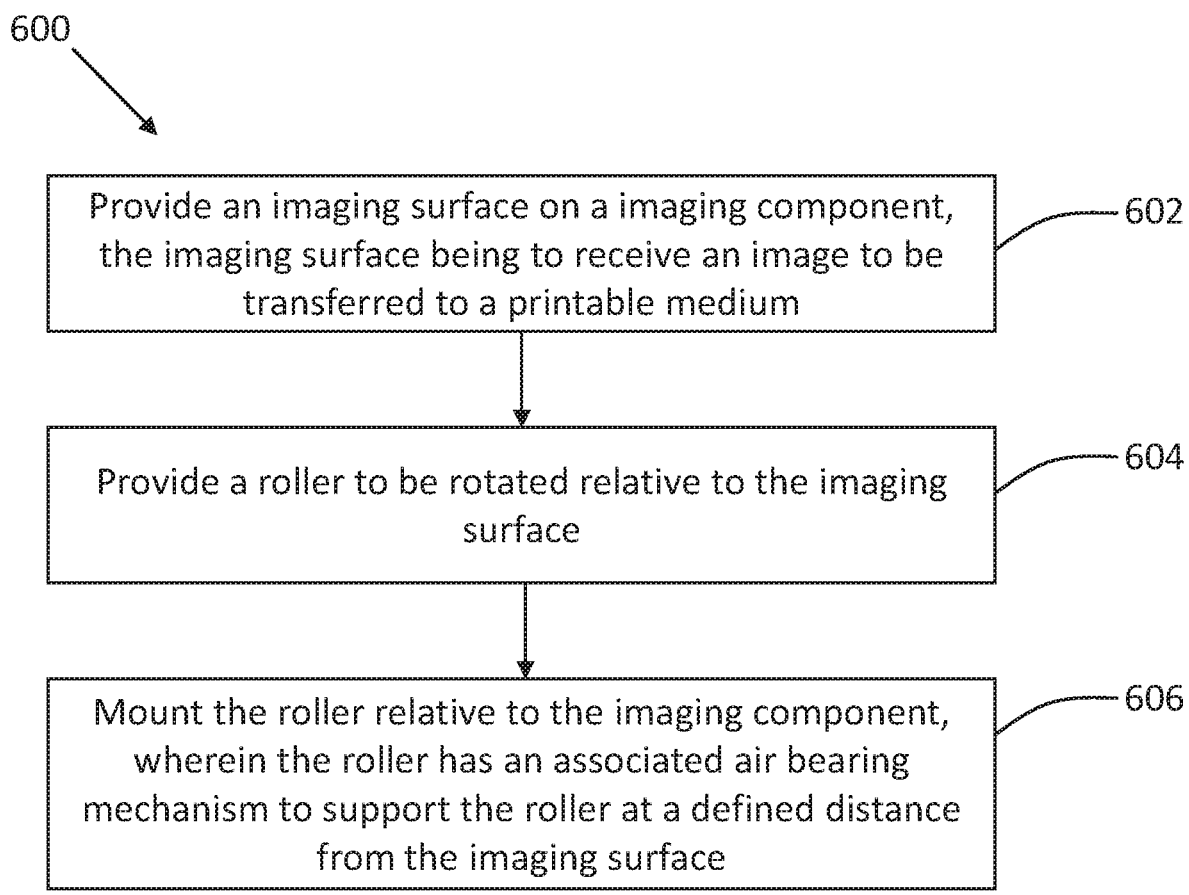
FIG. 6 is a flowchart of an example of a method of constructing a print apparatus.

An aspect of the disclosure relates to a method. The method may, in some examples, be considered to be a method of constructing or assembling a print apparatus. FIG. 6 is a flowchart of an example of a method 600 for assembling a print apparatus. The method 600 comprises, at block 602, providing an imaging surface on an imaging component, the imaging surface being to receive an image to be transferred to a printable medium. In some examples, the imaging surface may comprise the surface of the photoconductive imaging unit 104 discussed above. The imaging surface may, in some examples, comprise an imaging plate positioned around a core, such as a drum or roller. The imaging surface may be formed as a sleeve around the rotatable drum. The imaging surface may receive the image in the form of a latent image, which may be generated using a radiation source, such as a laser incorporated into a writing head, or print head.

At block 604, the method 600 comprises providing a roller to be rotated relative to the imaging surface. The roller may, in some examples, comprise or form a part of the component 102 discussed above. For example, the roller may comprise a charge-forming component, such as a charge roller, or a roller of a cleaning system to remove a substance from the imaging surface. In other examples, the roller may comprise another component (or a part thereof) which may interact with the imaging surface during use.

The method 600 comprises, at block 606, mounting the roller relative to the imaging component. The roller may have an associated air bearing mechanism to support the roller at a defined distance from the imaging surface. The air bearing mechanism may comprise the air bearing 106 discussed above and/or may be a part of the support assembly 100, 400, 500 discussed above. By mounting the roller relative to the imaging component in this way, a cushion of gas can be formed between the air bearing mechanism and the imaging surface of the imaging component without the air bearing mechanism or the roller coming into contact with the imaging surface. As a result, the risk of damage to the imaging surface (e.g. as a result of an impact with the roller or vibrations between the imaging surface on any mounting assembly of the component) may be greatly reduced.

Furthermore, mounting the roller relative to the imaging component using an air bearing mechanism in the manner described above enables the air bearing mechanism to track the imaging surface as the imaging component rotates, even if any anomalies or imperfections in the imaging component and/or the imaging surface cause runout. In other words, the air bearing generates a gas cushion which functions as a stiff spring, such that the air bearing mechanism and its associated roller move in a manner corresponding to the position of the imaging surface. Functioning in this way, the separation between the roller and the imaging surface remains substantially constant (i.e. a defined separation) as one or both of the components (i.e. the roller and the imaging component) rotate.

Figure 7:
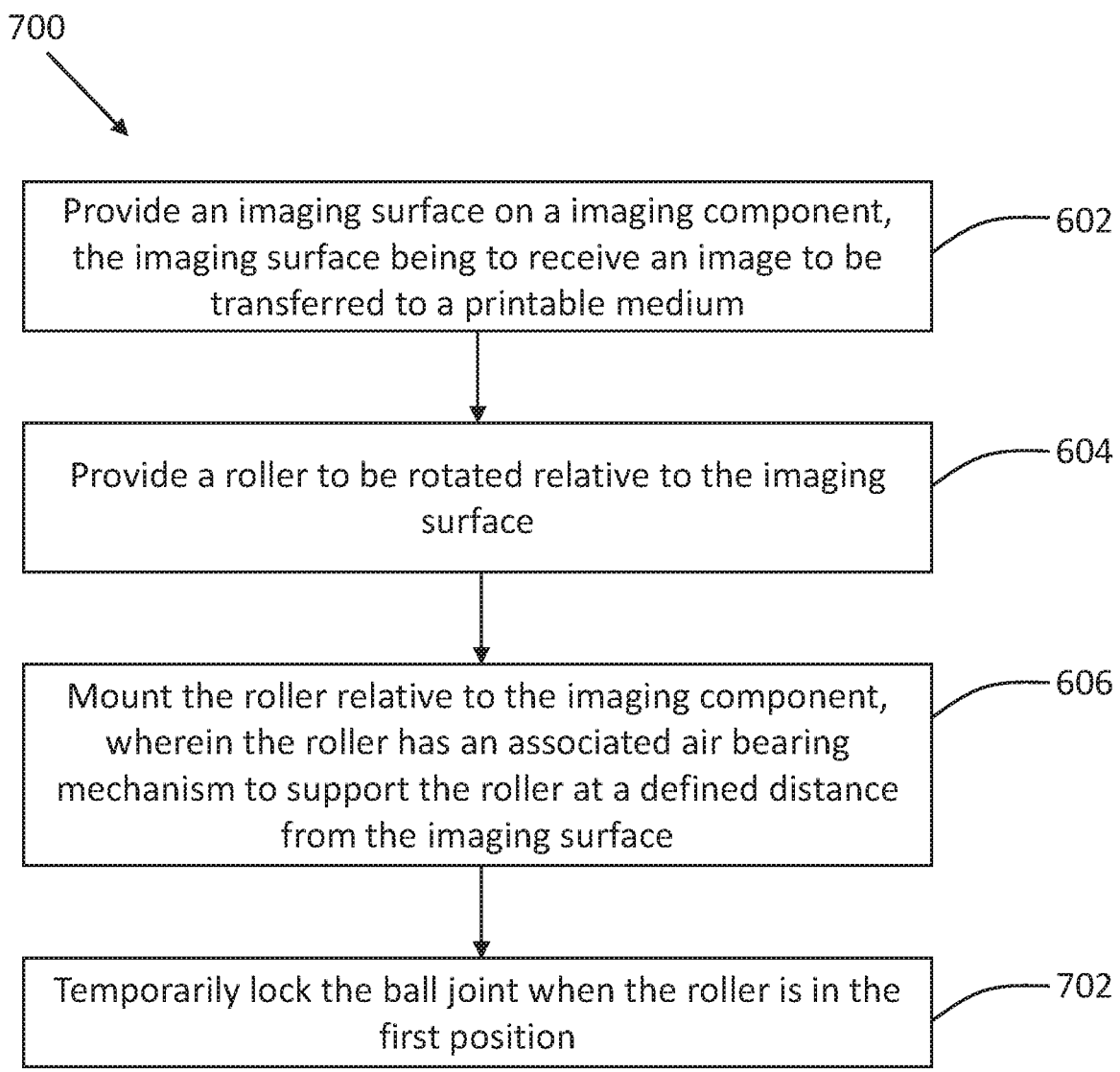
FIG. 7 is a flowchart of a further example of a method of constructing a print apparatus.

FIG. 7 is a flowchart of a further example of a method 700 for assembling a print apparatus. The method 700 may include blocks of the method 600 discussed above. For example, the method 700 may include blocks 602, 604 and 606. As explained above, in some examples, the roller may be moveable relative to the imaging component between a first position in which a component of the roller is to interact with the imaging surface and a second position in which the roller is not to interact with the imaging surface. For example, the roller may comprise a cleaning roller or sponge roller to engage the imaging surface in order to perform a cleaning function. In some examples, the roller may be mounted to the air bearing mechanism by a ball joint. In such examples, the method 700 may further comprise, at block 702, temporarily locking the ball joint when the roller is in the first position. In this way, while the ball joint is locked, movement of the roller about the ball joint is restricted to enable the air bearing mechanism (e.g. an air bearing pad of the air bearing mechanism) to remain in an appropriate, intended position and/or orientation relative to the imaging surface while it performs its intended function. When it is intended that the roller is not to perform its intended function, the ball joint may be released (i.e. unlocked), such that the roller can be moved into the second position. In some examples, a roller or component may not be moveable between first and second positions, and may be mounted to the air bearing mechanisms using ball joints. Such ball joints may also be locked to restrict movement of the roller relative to the air bearing mechanism (i.e. rotation about the ball joint) once the air bearing mechanism is aligned with the imaging surface.

Figure 8:
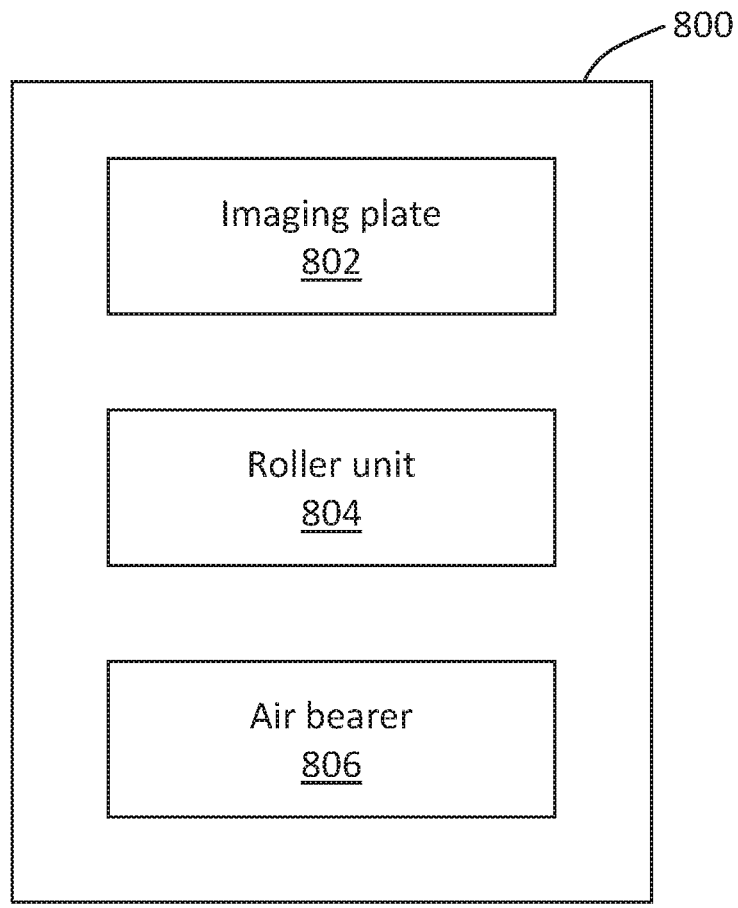
FIG. 8 is a simplified schematic of an example of a print apparatus.

A further aspect of the disclosure relates to a print apparatus. A print apparatus may, for example, incorporate a support assembly 100, 400, 500 as described above. FIG. 8 is a simplified schematic of a print apparatus 800. The print apparatus 800 comprises an imaging plate 802. The imaging plate 802 may, for example, comprise the imaging surface or the surface of the photoconductive imaging unit 104 discussed above. Specifically, the imaging plate 802 may comprise any surface to receive a latent image to be transferred to a printable substrate. The print apparatus 800 further comprises a roller unit 804 having a roller to be positioned proximal to the imaging plate 802. The roller unit 804 may, for example, be positioned adjacent to, touching or nearly touching, the imaging plate 802 during use. The print apparatus 800 further comprises an air bearer 806 associated with the roller unit, the air bearer to generate a cushion of gas to maintain a defined separation between the imaging plate 802 and the roller.

The air bearer 806 may comprise the air bearing 106 or air bearing mechanism discussed above. By directing pressurised gas through the air bearer 806, a cushion of gas may be formed between the air bearer and the imaging plate 802. The cushion of gas may prevent the air bearer 806 and/or the roller unit 804 from coming into contact with the photoconductive surface which, in turn, may reduce the chance of the imaging plate being damaged.

As the roller of the roller unit 804 (e.g. the component such as the charge roller or a cleaning/sponge roller) rotates relative to the imaging plate 802 during use, the thickness of the cushion of gas formed between the imaging plate and the air bearer is maintained substantially constant (e.g. by the weight of the roller unit urging the roller towards the imaging surface, as discussed above). Therefore, the distance between the roller and the imaging plate can be kept constant, or substantially constant, during use.

The roller unit 804 may comprise any component used in the print apparatus 800 which is to interact with the imaging plate. In some examples, the roller unit 804 may comprise a charge generation component (e.g. a charge roller) to generate a charge on the imaging plate 802. For example, an electrostatic charge may be generated as the charge generation component is rotated relative to the imaging plate. The charge generation component may apply a charge to the entire imaging plate before portions of the photoconductive surface are selectively discharged, for example using a print head or writing head. In other examples, the roller unit 804 may comprise a cleaning station as discussed above. The roller unit 804 may, for example, comprise a cleaning component for removing print agent from at least a portion of the imaging plate. In some examples, the roller of the roller unit 804 may comprise a cleaning roller, such as a sponge roller to remove substances (e.g. excess print agent) from the imaging plate as the roller rotates.

In some examples, the roller unit 804 may be mounted to the air bearer 806 using a spherical joint (also referred to as a ball joint). By using a spherical joint, the air bear 806 may rotate about the joint so as to be aligned with the photoconductive surface. In other words, the air bearer (e.g. an air bearing pad of the air bearer) may rotate into a position in which the air bearing pad is substantially aligned with (e.g. parallel to) the imaging plate 802.

The support assembly 100, 400, 500 and the air bearer 806 discussed herein may be incorporated into any type of print apparatus in which a component (e.g. a charge roller or a cleaning station component) is to interact with an imaging plate or photoconductive surface during rotation relative to one another. In some examples, the print apparatus 800 may comprise a liquid electrophotography (LEP) print apparatus.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A support assembly comprising:
   a component to interact with a photoconductive imaging unit, the component being rotatable relative to the photoconductive imaging unit; and
   an air bearing positioned adjacent to a surface of the photoconductive imaging unit, the air bearing to generate a cushion of gas to support the component at a defined distance from the photoconductive imaging unit;
   wherein the component is mounted to the air bearing using a ball joint.

2. The support assembly according to claim 1, wherein the component comprises a charge generation component to generate an electrostatic charge on the surface of the photoconductive imaging unit as the charge generation component is rotated relative to the photoconductive imaging unit.

3. The support assembly according to claim 1, wherein the component comprises a cleaning component for removing print agent from at least a portion of the surface of the photoconductive imaging unit.

4. The support assembly according to claim 3, wherein the cleaning component is movable relative to the photoconductive imaging unit between a first position in which the cleaning component is to interact with the surface of the photoconductive imaging unit and a second position in which the component is not to interact with the surface of the photoconductive imaging unit.

5. The support assembly according to claim 1, further comprising a locking mechanism to lock the ball joint so as to restrict motion of the component within the ball joint.

6. The support assembly according to claim 1, wherein the air bearing is to generate the cushion of gas such that the separation between the component and the surface of the photoconductive imaging unit is between around 5 micrometres and around 80 micrometres.

7. The support assembly according to claim 1, wherein the air bearing is to generate the cushion of gas between the air bearing and the surface of the photoconductive imaging unit.

8. A method comprising:
providing an imaging surface on an imaging component, the imaging surface being to receive an image to be transferred to a printable medium;
providing a roller to be rotated relative to the imaging surface; and
mounting the roller relative to the imaging component;
wherein the roller has an associated air bearing mechanism to support the roller at a defined distance from the imaging surface;
wherein the roller is moveable relative to the imaging component between a first position in which a component of the roller is to interact with the imaging surface and a second position in which the roller is not to interact with the imaging surface;
wherein the roller is mounted to the air bearing mechanism by a ball joint; and
wherein the method further comprises:
temporarily locking the ball joint when the roller is in the first position.

9. A print apparatus comprising:
an imaging plate;
a roller unit having a roller to be positioned proximal to the imaging plate; and
an air bearer associated with the roller unit, the air bearer to generate a cushion of gas to maintain a defined separation between the imaging plate and the roller;
wherein the roller unit is mounted to the air bearing mechanism using a spherical joint.

10. The print apparatus according to claim 9, wherein the print apparatus comprises a liquid electrophotography print apparatus.

11. The print apparatus according to claim 9, wherein the roller unit comprises a charge generation component to generate a charge on the imaging plate.

12. The print apparatus according to claim 9, wherein the roller unit comprises a cleaning component for removing print agent from at least a portion of the imaging plate.

* * * * *